United States Patent [19]
Patzschke et al.

[11] Patent Number: 5,880,209
[45] Date of Patent: *Mar. 9, 1999

[54] BINDER FORMULATION FOR PRODUCING PIGMENT

[75] Inventors: Hans-Peter Patzschke; Armin Goebel, both of Wuppertal; Jürgen Döbert, Sprockhövel; Reinhard Windmann, Wuppertal, all of Germany

[73] Assignee: Herberts GmbH, Wuppertal, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 807,379

[22] Filed: Feb. 27, 1997

Related U.S. Application Data

[63] Continuation of Ser. No. 590,731, Jan. 24, 1996, abandoned, which is a continuation of Ser. No. 410,394, Mar. 27, 1995, abandoned, which is a continuation of Ser. No. 275,340, Jul. 14, 1994, abandoned, which is a continuation of Ser. No. 131,862, Oct. 5, 1993, abandoned, which is a continuation of Ser. No. 966,898, Oct. 26, 1992, abandoned, which is a continuation of Ser. No. 849,655, Mar. 9, 1992, abandoned, which is a continuation of Ser. No. 640,855, Jan. 14, 1991, abandoned.

[30] Foreign Application Priority Data

Jan. 13, 1990 [DE] Germany .......................... 40 00 889.4

[51] Int. Cl.⁶ ............................... C08J 3/00; C08K 3/20; C08L 75/00
[52] U.S. Cl. ........................... 524/541; 524/839; 524/840
[58] Field of Search ..................................... 524/591, 839, 524/840

[56] References Cited

U.S. PATENT DOCUMENTS 3,917,556  11/1975  Baurecht et al. ........................ 427/445
4,914,148   4/1990  Hille et al. .............................. 524/591

*Primary Examiner*—Patrick D. Niland
*Attorney, Agent, or Firm*—Schweltzer Cornman Gross & Bondell LLP

[57] ABSTRACT

A pigment paste forming resin having a viscosity of from about 50 to about 5,000 mPa and a solids content of from about 20 to about 40%, containing from about 20 to about 50 parts of a polyester urethane resin having an acid number of from about 10 to about 50, with from about 70 to about 100% of the acid groups being neutralized, the resin being prepared by the reaction of (a) one or more polyester polyols that do not contain any carboxyl groups, having an OH number of from about 35 to about 200, and a number average molecular weight of from about 500 to about 5000, mixed with from about 2 to about 30 wt. % based on the polyester polyol of one or more low molecular weight diols having a molecular weight of from about 60 to about 350, whereby a part of the low molecular weight diol contains at least one acid group capable of forming an anion, and with 0 to about 6 wt. % based on the polyester polyol of one or more low molecular weight triols having a molecular weight of from about 60 to about 350, said reaction being with (b) one or more diisocyanates in which where the ratio between the OH groups of polyester polyol, diol, and triol to the NCO groups of the diisocyanate is more than from about 1.0 to about 1.3, whereby the quantity of diisocyanate is selected to insure that the polyester urethane produced has a number average molecular weight of from about 2,000 to about 30,000; the reaction being carried out in the presence of (i) from about 0.3 to about 18 parts by weight of ammonia and/or an amine; (ii) from about 4 to about 25 parts by weight of one or more organic solvents that are at least partly miscible with water; and (iii) from about 15 to about 75 parts by weight of water.

10 Claims, No Drawings

BINDER FORMULATION FOR PRODUCING PIGMENT

This is a continuing application of U.S. Ser. No. 08/590,731, filed Jan. 24, 1996, which was a continuation of U.S. Ser. No. 410,394, filed Mar. 27, 1995; which was a continuation of U.S. Ser. No. 08/275,340, filed Jul. 14, 1994; which was a continuation of U.S. Ser. No. 08/131,862, filed Oct. 5, 1993; which was a continuing application of U.S. Ser. No. 07/966,898, filed Oct. 26, 1992; which was a continuation of Ser. No. 07/849,655, filed Mar. 9, 1992; which was a continuation of Ser. No. 07/640,855 filed Jan. 14, 1991; all now abandoned.

FIELD OF THE INVENTION

The invention relates to binder formulations suitable for dispering pigments into a paste for incorporation in water dilutable binder for aqueous coating media.

BACKGROUND OF THE INVENTION

Problems arise commonly as a result of pigment agglomeration or sediment formation when pigments are incorporated in water dilutable resins, particularly for water based coatings. To produce stable, water dilutable lacquers it is necessary thoroughly to wet the pigments and to grind them in appropriate dispersing apparatus to a very fine particle size such as smaller than $10\mu$, and suitably smaller than $3\mu$. If low solvent containing, water dilutable dispersions or emulsions are needed then the shearing forces that arise are inadequate due to the very low viscosities. Therefore, in these cases it is necessary to substitute for a part of the binder that is used a paste forming resin in which the pigments are formed into a paste. These so called pigment pastes or grinding pastes are then mixed with the remaining binder to be lacquerified or otherwise completed. Once the object has been sprayed, a transparent one- or two-component lacquer is generally applied after drying, or on exposure to air, whereupon the two layers are jointly baked.

The paste forming resins to be used for such grinding pastes, also referred to as "pasting" resins, binders or pigment bearing resins, have a variety of required characteristics. The paste binder should, for instance:

- have good compatibility with the principal binder in the film and, at the required rate of addition, cause no impairment of the lacquer characteristics;
- be capable adequately of wetting the pigments, to enable even fine dispersion with a minimum of energy;
- possess a viscosity within a range enabling paste formation with as high a pigment concentration as possible;
- prevent pigment flocculation during lacquerification;
- have a good shelf life for long periods of time, i.e. the pastes must not thicken, nor may the pigments form sediments or agglomerates;
- contain only such solvents as do not cause the particles of the main binder to swell; and
- cause no loss or other changes in color.

Water dilutable pigmented lacquers are used as primers, fillers, unit components of metallic base coats, e.g. with the aid of high molecular weight polyacrylate emulsions, polyurethane dispersions, polyester, or alkyd dispersions. Special combinations for the production of metallic base coats, which are subsequently sprayed conventionally dissolved, or in transparent aqueous lacquers have been described in European patents Nos. 260,447, and 297,576. The paste forming resins described in these publications do not, however, allow the basic characteristics of the lacquers present in the total system to become fully apparent. Polyester and acrylate resins are mentioned, for instance, in European patent No. 260,447. Although the suitable acrylate resins possess very good wetting characteristics, they are not fully compatible with the polyurethane dispersions or the polyesters grafted with acrylic monomers. This results in an impairment of the metallic effect.

In European patent No. 297,576, on page 10, lines 38 to 49, urethane modified polyesters with an acid number from 40 to 100 are described in general terms. These polyesters are produced by the reaction of a saturated polyester containing OH groups, with one or more aromatic, cycloaliphatic, and/or aliphatic polyisocyanates, at an equivalent OH group: isocyanate group ratio from 10:1 to 1:1. Examples of this type of paste forming resin are not given in that publication. Practical tests prove that due to their high acid number, these binders impair the moisture resistance values of the latter:

German patent publication No. 3,409,080 describes metal effect lacquers in accordance with the two layers wet-in-wet lacquering process with emulsifier containing aqueous dispersions based on oil free polyesters, alkyd resins, and/or acrylate resins with an acid number not higher than 30 and an OH number not higher than 150, in combination with water soluble amino resins. The examples refer only to a urethanized alkyd resin modified with fatty acid. There is no mention of any suitability as paste forming resins.

DESCRIPTION OF THE INVENTION

It is the object of the present invention to provide a paste forming resin formulation suitable for dispersing in a paste pigments and/or fillers for aqueous media, which insures good pigment wetting even in the absence of an emulsifier, and has good compatibility with a broad range of binders for aqueous coating media.

This object is achieved by a binder or paste forming resin formulation suitable for the production of pigment pastes, with a viscosity of from about 50 to about 5000 millipascals (mPa), and having a solids content of from about 20 to about 40 wt. %. This formulation comprises from about 20 to about 50 parts by weight of a polyester urethane resin having an acid number of from about 10 to about 50, with from about 70 to about 100% of the acid groups being neutralized, the resin being prepared by the reaction of (a) one or more polyester polyols that do not contain any carboxyl groups, having an OH number of from about 35 to about 200, and a number average molecular weight of from about 500 to about 5000 mixed with from about 2 to about 30 wt. % based on the polyester polyol of one or more low molecular weight diols having a molecular weight of from about 60 to about 350, whereby a part of the low molecular weight diol contains at least one acid group capable of forming an anion, and with 0 to about 6 wt. % based on the polyester polyol of one or more low molecular weight triols having a molecular weight of from about 60 to about 350, with (b) one or more diisocyanates, where the ratio between the OH groups of polyester polyol, diol and triol and the NCO groups of the diisocyanate is more than from about 1.0 to about 1.3, whereby the quantity of diisocyanate is selected to insure that the polyester urethane produced has a number average molecular weight of from about 2,000 to about 30,000; in the presence of
 (i) from about 0.3 to about 18 parts by weight of ammonia and/or an amine;

(ii) from about 0 to about 25 parts by weight of one or more organic solvents that are at least partly miscible with water;
and (iii) from about 15 to about 75 parts by weight of water.

Unless specifically provided otherwise, any reference herein throughout the specification and the claims to any viscosity measurement or value is intended to refer to such values obtained in a coaxial cylindrical viscometer with a shear gradient of from 100 to 2000 sec$^{-1}$, suitably 644 sec$^{-1}$ in a 40% solution in the usual lacquer solvent used in its synthesis, suitably butoxyethanol at 25° C. as determined by German Standard DIN 53,019, or International Standard ISO 3,219.

The term "pigment" as used throughout the specification and the claims is intended broadly to cover any particulate colorant, metal, filler, and the like solid.

The paste forming resin formulation according to the present invention is a polyester urethane resin, which is a urethanized oil free polyester containing OH groups, produced by reacting a diisocyanate with an excess of a polyol mixture. With this process the suitable OH group : NCO group ratio is higher than 1 to 1.3, suitably up to about 1.1. The polyol mixture can suitably contain one or more polyester diols not containing carboxyl groups, to which from about 2 to about 30 wt. % of one or more low molecular weight diols and 0 to about 6 wt. %, suitably up to about 4 wt. % of low molecular weight triols have been added, whereby a part of the diols comprises in addition at least one acid group capable of forming an anion.

The polyester urethane resin is produced, for instance, at temperatures of from about 20° C. to about 150° C., suitably from about 45° C. to about 90° C. and, if required, in the presence of catalysts. The polyaddition is carried out after rapid mixing, and the reaction mass is extensively stirred in the melt, or after dilution, with dry solvents that do not react with the isocyanate group.

Stirring is continued until virtually all isocyanate groups have been converted. On the other hand, the reaction can also take place in stages. In that case in the first stage one can produce, for instance, an isocyanate prepolymer, without solvents and with the aid of excess isocyanate and the OH polyester as well as the diol forming anion groups. Then, after dilution with a small amount of solvent, the chain of the isocyanate prepolymer is lengthened with a low molecular weight polyol. Further solvent is used for dilution as the viscosity continues to rise. Depending on whether diols, or higher functional polyols are used, one or several hydroxy groups are obtained at the end of the chain. Most suitable is the reaction with diols to achieve chain ending with only one hydroxyl group.

A different sequence is also possible if the production takes place in stages. The diol that forms the anion groups, such as dimethylolpropionic acid, can, for instance, be reacted in an organic solvent primarily with one or several diisocyanates, whereupon further reaction takes place with a polyester and a low molecular weight diol and/or triol that did not contain any anion groups. If necessary, polyaddition can he discontinued at a required target temperature and/or end viscosity with the aid of monofunctional additives such as butanone oxime, dibutylamine, or alcoholic solvents.

The additives introduced maintain in a liquid state the substance that take part in the reaction, and enable better temperature control while the reaction is in progress. Suitable solvents are, for instance, dimethyl formamide, dimethyl acetamide, 1-methyl-2-pyrrolidone, acetonitrile, tetrahydrofuran, dioxane, ethyl acetate as well as ketones such as acetone or 2-butanone, fully etherified mono-or digylcols, ethylene glycol, or propylene glycol, such as diethylene glycol dimethylether, or propylene glycol dimethylether, as well as ketones substituted with methoxy groups such as methoxy hexanone. After reaction the solvents are, if required, either distilled off under vacuum, or they remain as solvent constituents in the paste binder to be produced. If necessary, small amounts of organotin compounds are added, such as dibutyultin dilaurate, dibutlyltin oxide, dibutlyltin diphenolate and/or tertiary amines such as triethylamine, benzyldiimethylamine, 1,4-diazabicyclo (2.2.2)octane, bis-(dimethylamino-methyl)phenol, bis-(2-dimethylamino-ethyl)ether, or tetramethylguanidine.

The polyester polyol can be produced in various ways, for instance in the melt or by azeotropic condensation at temperatures from e.g. about 160° C. to about 260° C., suitably from dicarboxylic acid and dialcohols, which, if necessary, can be slightly modified by small amounts of trialcohols. The reaction is carried out, possibly in the presence of catalysts such as tin octoate or dibutyltin oxide, until virtually all carboxyl groups (acid number ≧1) have been reacted. The required OH number of from about 35 to about 200, suitably more than about 50 and less than about 150, and the molecular weight of from about 500 to about 5000, suitably over about 600 and less than about 3000, is determined by the amount of the excess alcohol used. It is sufficient to determine the OH-number to determine the theoretical molecular weight, taking into account the functionality of 2 with linear configuration. The OH number, according to German Standard DIN 16,945, is the number of milligrams of KOH that is equivalent to the amount of acetic acid bound by 1 g of material during acetylation (acetyl No.), and subsequent saponification. The number average molecular weight is then calculated according to the formula $$\overline{M}n = \frac{56100}{\text{OH number} \times 2}$$

The most suitable dicarboxylic acids have a linear or branched aliphatic, alicyclic or aromatic structure. The two carboxyl groups are suitably arranged so that they cannot form any intramolecular anhydrides, i.e. the two carboxyl groups are separated from one another e.g. by a $C_{3-14}$, suitably $C_{4-8}$ chain. Examples of suitable dicarboxylic acids include adipic acid, 2,2,4-trimethyl adipic acid, azelaic acid, sebacic acid, 1,3- and 1,4-cyclohexanedicarboxylic acid, 1,4- or 1,3-di- or tetra-hydrophthalic acid, isophthalic acid, isophalic acids substituted with alkyl groups, and/or terephthalic acid.

The dialkanols also have a linear or branched aliphatic, or cyclic structure. Their two OH groups are also separated from one another e.g. by a $C_{3-14}$, suitably $C_{4-8}$ chain. Diols with sterically blocked primary OH groups or with secondary hydroxy groups are used to produce particularly hydrolysis resistant polyesters. Examples of such diols are butanediol 1,4-hexanediol, 1,6-hexanediol, 2,5-cyclohexanediol, 1,4-2-ethylhexanediol, 1,3,2,2,4-trimethylpentanediol, 1,3-hydroxypivalic neopentylglycolester, cyclohexane dimethanol, 2,2-dimethyl-1,3-propanediol, 2-ethyl-2-butyl-1,3-propanediol, 1,1-isopropylidene-bis-(p-phenoxy)-1-ethanol, 2,2-bis-(hydroxymethyl)-butanol, 1,3-di-(hydroxyethyl)-5,5-dimethylhydantoin, as well as hydrogenated bisphenols A or B. The dialcohols can contain small proportions of higher polyols such as glycerine or trimethylolpropane to cause branching. However, the amount should be so small to insure that no crosslinked products occur. One adds 0 to about 6 wt. % and suitably from about 0.5 to about 4 wt. % based on the polyester polyol, of low molecular weight triols with a molecular weight of from about 60 to about 350. A linear aliphatic structure of the polyester polyols is preferred, which, if necessary can contain proportional amounts of aromatic dicarboxylic acid and which preferably has an OH group at the end of the molecule. The polyester polyols have no free carboxyl groups and are suitably free of olefinic double bonds.

According to the invention, also polyester diols can be used such as polyester polyols. The polyester diols can be produced by condensation of hydroxycarboxylic acids. They contain the recurrent polyester element of the formula

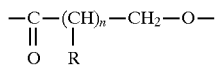

wherein n is a cardinal number from 3 to 18, suitably from 4 to 6, R is hydrogen, or an alkyl, cycloalkyl, and/or alkoxy residue, with no substituent higher than $C_{12}$. The basic components are, for instance, hydroxycaproic acid, hydroxybutyric acid, hydroxydecanoic acid, and/or hydroxystearic acid. As a starting material one can also use a lactone of the formula

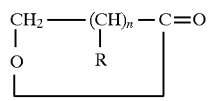

wherein n and R have the same meanings as given above. Unsubstituted ε-caprolactones are suitable for producing polyester diols, wherein n is 4, and R is hydrogen, starting from low molecular weight polyols. Also OH functional carbonic esters are regarded as polyesters diols free from carboxyl groups. It is possible to produce such carbonic esters e.g. by reacting diethyl- and/or diphenyl carbonate with glycols, or dialkanols such as 1,6-hexanediol.

The molecular distribution and the number of urethane groups incorporated can be influenced by substituting low molecular weight polyols, suitably glycols, or dialkanols, for from about 2 to about 30 wt. % of the higher molecular weight polyester diol. Suitably dialkanols with a molecular weight of from about 60 to about 350, such as are already used with the polyester, can be suitably employed for that purpose. However, the dialkanols used need not be identical to those used in the polyester.

To be able to dissolve the polyester urethane resin in water a part of the low molecular weight diols is replaced by diols that still contain at least one acid group capable of being neutralized and capable of forming anions, such as carboxylic and/or phosphoric acid groups. Carboxylic acid or carboxylate groups are most suitable. They are reacted slowly to insure that the isocyanate groups of the diisocyanate preferably react with the hydroxyl groups of the molecule. For that reason suitably alkanoic acids are employed with two OH substituents at the carbon atoms in the α-position. These polyols have at least one, and generally one to three carboxyl groups in the molecule. They have from about 2 to about 25, suitably from about 3 to about 10 carbon atoms. Examples of such compounds are dihydroxypropionic acid, dihydroxysuccinic acid, dihydroxybenzoic acid and/or dihydroxycyclohexane-monocarboxylic acid. An especially suitable group of dihyroxyalkanoic acids are the 2,2-dialkylol-alkanoic acids the formula

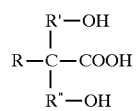

wherein R is hydrogen or an up to $C_{20}$ alkyl moiety; R' and R" are, independently of one another, linear or branched $C_{1-6}$ alkylene chains, respectively, most suitably —$CH_2$—. Examples of such compounds are 2,2-dimethylol acetic acid, 2,2-dimethylol propionic acid, 2,2-dimethylol butyric acid, and 2,2-diemthylol valeric acid. The most suitable dihydroxy alkanoic acid is 2,2-dimethylol-propionic acid. The amount of dimethylolpropionic acid introduced into the mixture by way of diol is such to insure that the acid number of the finished polyester urethane resin is from about 10 to about 50, suitably more than about 15 and less than about 40. Most suitable are a lower limit of about 20, and an upper limit of about 30. Suitable compounds containing phosphoric acid groups are e.g. 2,2-dimethylolpropane-phosphonic acid or diethanolamide-methane-phosphonic acid. These monomers forming anion groups are added in a sufficient quantity to insure that the acid number of the polyurethane resin is within the required range.

Diisocyanates typically used for reacting with the polyol/diol mixture are e.g. linear or branched aliphatic, cycloaliphatic, and/or aromatic hydrocarbons with an isocyanate content between about 20 and about 50%. The functional groups are suitably two isocyanates moieties asymmetrically or symmetrically arranged in the molecule. They can be aliphatic, alicyclic, arylaliphatic or aromatic moieties. The structure can be selected for instance, in accordance with the required application of the coating medium to be pigmented. Thus it is possible, for example, for later incorporation in primers to use the isomers or isomer mixtures or organic diisocyanates of toluylene diisocyanate. Other examples are 1,4-bis-(isocyanato)benzene, 2,4-bis-(isocyanato)toluene, bis-(isocyanato)naphthalene, and 4,4'-bis-(isocyanato)-3,3'-dimethyl-biphenyl. Diisocyanates in which the isocyanate group is bound to a nonaromatic, possibly α-substituted carbon atom, are for instance, suitable for topmost lacquer layers of multilayer lacquer systems due to their high resistance to ultraviolet light. Examples of suitable aliphatic diisocyanates are of the formula

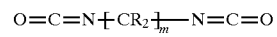

wherein m is a cardinal number of from 2 to 20, particularly 5 to 8, and each R is independently hydrogen, or a $C_{1-8}$ alkyl residue, suitably methyl. Examples of such diisocyanates include 1,6-bis-(isocyanato)pentane, 1,6-bis-(isocyanato) hexane, 1,6-bis-(isocyanato)-2,2,4-trimethylhexane, 1,4-bis-(2-isocyanato-ethyl)cyclohexane or 1,3-bis-(2-isocyanato-methyl)cyclohexane.

Examples of suitable cycloaliphatic diisocyantes are 1,4-bis-(isocyanato)-cyclohexane, bis-(4-isocyanato-cyclohexyl)methane, 5-isocyanato-3-(isocyanato-methyl)-1,1,3-trimethylcyclohexane, or menthanediisocyanate. Arylaliphatic diisocyanates that can be used include, for instance, 1,3-bis-(1-isocyanato-methyl)benzene, or 1,4-bis (1-isocyanato-1-methylethyl)-benzene. Particularly suitable are polyester urethane resins based on 5-isocyanato-3-(isocyanato-methyl)-1,1,3-trimethylcyclohexane (i.e. isophoronediisocyanato) and/or bis-4-isocyanato-cyclohexylmethane sold by Bayer AG under the trademark Desmodur W, as a mixture of differing steric configurations. The synthesis results from joint reaction of the reagents in the mixture or in stages to produce a sequential structure.

Taking into account the polyols and diols in the mixture, the equivalent ratio of the diisocyanate used when producing polyurethane resins is selected so that the finished polyester urethane resin has a number average molecular weight (Mn) of from about 2,000 to about 30,000, suitably more than about 3,000 and less than about 10,000, measured with a gel chromatograph in tetrahydrofuran, calibrated with polystyrene. The viscosity of the polyester urethane resin is in the region of from about 10 to about 10,000 mPa, suitably more than about 50 and less than about 5,000 mPa, and most suitably from about 100 to about 3,000 mPa.

The carboxyl equivalent weight of the polyester urethane resin is between about 1000 and about 6000, suitably about above 1500 and below about 4000. The equivalent weight can be easily determined by dividing the weight of the polyurethane resin with the number of carboxy groups in the polymer. The polyester urethane resins are suitably not crosslinked, i.e. they are suitably free of microgel.

The paste forming resin or paste binder in which the pigments can be dispersed into a paste, is produced from the polyester urethane resins according to the present invention without emulsifiers but with the addition of neutralizing agent, water and, if required, further organic solvents. The paste resin is first diluted during this process with water dilutable, polar organic solvents to a solids content of from about 50 to about 90 wt. %, suitably more than about 60 and less than about 85 wt. %. In this case the solvents remaining from the production of the paste resin are retained in the binder, or are possibly distilled off under vacuum at elevated temperatures and substituted with proton active organic solvents. For instance, alcohols such as ethanol, isopropanol, n-butanol, sec-butanol, or alkoxyethanols, and alkoxy propanols can be used for that purpose. Secondary butanol or butoxyethanol are most suitable. These solvents are intended to served as solubilizers and to adjust the viscosity of the paste binder so that it remains suitable for processing.

Solubility in water is due to the formation of salts with ammonia and/or amines, e.g. primary, secondary and/or tertiary alkyl, and/or alkanolamines. During this process the viscosity steeply increases. The amount of amine added is selected to insure that from about 70 to 100% of the carboxyl groups, but suitably more than about 80 and less than about 95%, are neutralized. The amines that are employed have a $pK_B$ value of $\leq 6$ and are suitably miscible with water. Most suitable are those amines that have an as high a vapor pressure as possible, i.e. such as will evaporate as quickly as possible from an applied film. Examples of amines are diethylamine, triethylamine, monoethanolamine, methylethanolamine, dimethylaminoethanol, dimethylisopropanolamine, 2-dimethylamino-2-methyl-1-propanol, 2-amino-2-methyl-1-propanol, morpholine, or n-methylmorpholine. The mixture is thereafter carefully diluted with suitably fully deionized water until a virtually clear, highly viscous paste/binder compound is formed. The upper limit of the viscosity of the paste/binder depends on its processability, with a solids content of from about 20 to about 40, suitably above about 25 and below about 35. When measuring with a rotational viscometer the viscosity is between a 50 and about 100 mPa, suitably over about 500 and less than about 3,000 mPa.

Both opaque and transparent pigments can be dispersed into a paste in this paste binder to achieved colored metal effects or uncolored tints. Conventional dispersion methods can be employed. It is, for instance, possible to use colorants such as are described in German Standard DIN 55,944. Inorganic pigments can be used such as titanium dioxide, carbon black, iron oxides, and/or organic pigments such as phthalocyanines, quinacridones, and/or halogenated thioindigo pigments, as well as fillers such as barium sulfate, talc, or layered silicates. By way of dispersing apparatus disc agitators, three-roller mills, ball mills, or suitably sand or bead mills can be used for dispersing. The optimal formulation of the material to be ground depends on the appropriate combination of the amine constituents of the material to be ground, such as pigment, binder and solvent e.g. water, and the optimum formulation should be determined separately for each kind of dispersing apparatus. It is the function of the dispersing process to predecompose, as far as possible, pigment agglomerates into individual particles to enable them to develop their full optical effect. The proportion of binder in the material to be ground should be at least sufficiently high to suffice for the complete wetting of the pigment. In general it is favorable to use the highest possible concentration to entrain a minimum of paste resin into a eventual lacquer formulation prepared therewith. The optimal viscosity range is determined with a view to achieving total dispersal within a minimum of time. The optimal composition of the material to be ground is adjusted according to the pigment in question. In general the pigment paste is viscous. The material to be ground can be additionally diluted prior to or after dispersal by paste forming, with portions of the aqueous binder dispersions described below to facilitate tinting operations.

Conventional aids such as antifoaming agents and dispersing aids can be added to the material to be ground. It can be advantageous although not essential to add, with a view to perfect wetting of the pigment surface, dispersing aids such as wetting agents to the material to be ground, inasmuch as they are adsorbed by the surface of the pigments and promote the wetting process by reducing the interfacial tension between pigment and binder. Conventional wetting agents can be used for that purpose. Metallic or nonmetallic effect pigments such as aluminum bronzes, pearly lustre, or interference pigments are usually wetted in a separate stage of the process and then stirred into the transparent, colorant pigment paste.

If required, additional water, solvent, and/or ammonia or amine can be added during the grinding process, to adjust the viscosity. The suitable method for producing pigment pastes, is to form a paste of from about 5 to about 65, suitably from about 13 to about 63 parts by weight of pigment and/or filler from about with 10 to about 95, suitably from about 12 to about 60 parts by weight of the binder compound according to the invention. Suitably 0 to about 40 parts by weight of water, 0 to about 5 parts by weight of solvent, 0 to about 5 parts by weight of ammonia and/or amine, and 0 to about 5 parts by weight of auxiliary agent are employed from among the optional ingredients. The above mentioned parts by weight always add up to 100 parts by weight.

Virtually all water dilutable synthetic resins can be used for completion of lacquerification of the material to be ground, that are compatible with the paste resin. Such resins include, for instance, alkyd resins, modified with fatty acids, if required in urethanized or acrylated form, oil free polyesters, if required in urethanized or acrylated form, self crosslinking and/or externally crosslinking acrylate resins or their mixtures.

The paste forming resin according to the present invention is particularly suitable for pigmenting low viscosity, low solvent combining aqueous synthetic resin dispersions with a. an acid number of from about 5 to about 50, suitably more than about 10 and less than about 40, and in particular less than about 30, b. a viscosity of the aqueous emulsion of less than about 500 mPa, suitably less than about 300 mPa, and more especially less than 200 mPa, and c. a mean particle size of from about 50 to about 500 nm, suitably less than about 300 nm, and more particularly less than about 200 nm, and suitably over about 75 nm, and more particularly over about 100 nm.

Examples of such products diluted with water include emulsion copolymers, polyurethane dispersions containing urea groups, as well as dispersions of acrylated polyesters, and acrylated polyurethanes.

Suitable emulsion copolymers containing emulsifier or suitably free from emulsifier are produced in a manner known per se with the aid of free radical polymerizable monomers such as styrene, acrylic acid, methacrylic acid, acrylic esters and methacrylic esters, at reaction temperatures of from about 20° C. to about 95° C.

Particularly suitable are combinations of melamine resins with polyurethane/urea dispersions with acrylated polyesters, or with acrylated polyurethane resins. Similar lacquer systems are also described in German patent No. 3,638,124 (acrylated polyester and polyurethane/urea dispersions), and German patent No. 3,722,005 (acrylated polyurethane resin).

Polyurethane (urea) dispersions suitable for lacquerifying or completing the coating agent or lacquer system are produced, for instance, by the chain of an anionic prepolymer with an isocyanate group in the end position being extended with polyols, polyamines and/or hydrazine compounds. Extension of the chain takes place after neutralization of the acid groups with tertiary amines and emulsification in water. The acid number is controlled by the amount of anion containing compounds in the isocyanate containing prepolymer, which are used during production. The particle size depends on the molecular weight of the OH polyester used, as well as on the acid number of the building up sequence. The number average molecular weight as measured with the aid of gel chromatography in dimethyl formamide, and calibrated with polystyrene, is between about 20,000 and about 500,000, suitably more than about 40,000 and less than about 350,000. Urea containing polyurethane dispersions are suitably produced with at least two and suitably four urethane groups and at least one COOH group in the NCO prepolymer.

The anionic, isocyanate containing prepolymers suitable for use in polyurethane urea dispersions are produced e.g. by simultaneous reaction of a polyol mixture with an excess of diisocyanates, especially at a suitable NCO group/OH group ratio of over about 1.00 to about 1.4. The polyol mixture suitably contains one or more saturated polyester diols, possibly with an addition of one or more low molecular weight polyols, suitably diols, and a compound with two isocyanate reactive hydrogen atoms, containing, in addition, groups capable of forming anions. The reaction takes place at temperature of between about 20° C. and about 150° C., suitably between about 45° C. and about 90° C., suitably with the addition of a catalyst. The polyaddition takes place after rapid mixing and thorough stirring in the melt, or after dilution with dry solvents which do not react with the isocyanate group and correspond, for instance, to those described above with reference to the production of the paste forming resins. Polyaddition continues until virtually all hydroxyl groups have reacted. On the other hand, the reaction can also be carried out in stages, in a sequential series. For instance, the OH polyester is first reacted with the diisocyanate, with soft segments being formed during this process. Thereupon the remaining amount of isocyanate is reacted, subject to the addition of further isocyanate, with the compound containing the anion groups and, if required, low molecular weight dialkanols to form a hard segment, whereby the dialkanol and the diisocyanate need not be of the same type as those used in the first stage. The raw material used for producing the polyester containing OH groups, the low molecular weight dialkanols, and the diisocyanates are the same as those described above in connection with the production of paste forming resins.

Up to about 97 wt. % of the entire polyol mixture can be a saturated OH polyester having a molecular weight between about 400 and about 5000, suitably over about 600 and less than about 3000. Up to about 30 wt. % of the entire amount of polyol including the dialkanols modified with anion groups, and suitably more than about 2 and less than about 20 wt. %, are low molecular weight dialkanols having a molecular weight between about 60 and about 350. The amount of ionic carboxyl groups, available in the form of salts, as a result of neutralization of the anion groups generally corresponds to from at least about 0.4 wt. % to about 6 wt. % based on the solids. The isocyanate prepolymer contains from about 0.2 to about 15 wt. % isocyanate groups based on the solids. The amount of dry organic solvent, which must not react with isocyanate, can vary within wide limits and should be sufficient for forming a prepolymer solution of suitable viscosity. If the solvents which, if required, can be not soluble in water, have lower boiling points than the water, then after production of the polyurethane (urea) dispersion, they can be carefully distilled off by vacuum distillation or thin layer evaporation. Particularly suitably solvents are n-methyl-pyrrolidone and/or ketones such as methylethylketone, and acetone, and/or esters such as ethyl acetate.

The anionic groups of the NCO prepolymers used for producing the polyurethane dispersion are at least partly neutralized with a tertiary amine. The resultant increase of dispersabililty in water is sufficient for infinite dilutability. It also suffices for stably dispersing the neutralized urea containing polyurethane. Suitable tertiary amines are, for instance, trimethylamine, triethylamine, dimethylethylamine, dimethylbutylamine, n-methyl-morpholine, n-ethyl-morpholine, or alkoxy-alkylamines such as 2-methyl-oxyethyl-dimethylamine. Under conditions of careful processing, e.g. at from about 20° C. to about 30° C., tertiary dialkyl-aminoalcohols such as n-dimethylisopropanolamine can also be used. The NCO prepolymer is diluted after neutralization with water, whereupon a fine dispersion is obtained. Shortly afterwards the isocyanate groups still present are reacted with di- and/or polyamines with primary and/or secondary amino groups as well as hydrazine and its derivatives, or dihyrazides as chain extenders. This reaction causes further crosslinking and an increase in molecular weight. The competing reaction between amine and water on the one hand, and the isocyanate on the other is carefully controlled with regard to time, temperature, and concentration to achieve optimal characteristics, and is monitored to insure reproducible production. Water soluble compounds are suitable as chain extenders since they increase the dispersibility of the prepolymers in water. Organic diamines are suitable, since they usually build up the highest molecular weight without causing the resin to gel. This is possible by suitable choice of the ratio between the amino groups and the isocyanate groups.

The amount of chain extender depends on its functionality, the NCO content of the prepolymer, and the duration of the reaction. The ratio between the reactive amino group in the chain extender to the NCO groups in the prepolymer should generally be lower than a 1:1, and suitably in the range between about 1:1 and about 0.75:1. The presence of an excess of active hydrogen, particularly in the form of primary amino groups, can result in polymers with an undesirably low molecular weight. The polyamines are essentially alkylene polyamines with from about 2 to about 15 carbon atoms. They can support substituents without any hydrogen atoms capable of reacting with isocyanate groups. Examples are polyamines with linear, or branched aliphatic, cycloaliphatic, and/or aromatic structure, and at least two primary amino groups.

Appropriate diamines are ethylene diamine, propylene diamine, 1,4-butyl-enediamine, piperazine, 1,4-cyclohexydimethylamine, 2-methyl-pentamethylenediamine-1,5, hexamethylenediamine-1,6, trimethyl-hexamethylenediamine, menthane diamine, isophoronediamine, 1,3- or 1,4-bis-(aminomethyl)-cyclohexane, 1-methyl-2,4-diaminocyclohexane, or mixtures thereof. The chain can be extended at least in part by a polyamine with at least three amino groups containing reactive hydrogen, such as for instance diethylene triamine. Diamines can also be used as chain extenders, the primary amino groups of these being protected as ketimine which, after emulsification in water, become reactive due to the hydrolytic separation of the ketone. Apart from the hydrazine, the chains can also be extended with substituted hydrazides, such as monoalkyl- or arylhydrazide or bis-hydrazides such as adipic acid-bis-hydrazide.

Urea group containing polyurethane dispersions can be used in the coating media alone or suitably in a mixture with acrylated polyesters. Acrylated polyesters are, as described for example in German patents Nos. 3,301,729, and 3,544,337. Reaction products of these dispersions can be produced by free radical emulsion polymerization of copolymerizable α,β-unsaturated monomers in the presence of linear or branched carboxy functional polyesters which, if required, also contain epoxy groups, subject to the addition of at least one polymerization initiator, and at temperatures between 0° and about 150° C., suitably over about 20° C. and less than about 100° C., more suitably over about 40° C., and optionally under pressure.

Suitable polycondensates are produced in the melt or during the azeotropic condensation process by reaction of polycarboxylic acids and polyalcohols, by optionally adding saturated and unsaturated fatty acids (oils) and/or epoxy compounds at temperatures of from about 150° C. to about 260° C. Their acid number is such that they can be stably dispersed after neutralization in water.

Linear or branched aliphatic, cycloaliphatic and/or aromatic polybasic carboxylic acids, are used, suitably $C_{4-12}$ di-, tri- and tetracarboxylic acids, or their derivatives capable of esterification such as, for example anhydrides or methanol esters. Other than the dicarboxylic acids already mentioned in connection with the OH polyesters used for producing polyurethane ester resins, there can also be used, for instance phthalic anhydride, tetrahydrophthalic anhydride, tricarboxylic acids such as trimellitic anhydride, or maleic acid adducts on fatty acid with isolated or conjugate unsaturation, or tetracarboxylic acid such as pyromellitic dianhydride, or bis-anhydrides made from trimellitic acid anhydride and dialkanols. Also small amounts of monobasic acids such as benzoic acid, tert-bultylbenzoic acid or abietic acid which, if required, can be oil free, are advantageously added to the polyesters to adjust functionality and hardness. Also hydroxyl containing carboxylic acids such as 5-hydroxypentane carboxylic acid, or its lactone, dimethylol propionic acid, salicylic acid, tartaric acid, or cyclohexanol monocarboxylic acid can be introduced by esterification.

As polyfunctional alcohols suitably there can be used linear or branched $C_{2-4}$ aliphatic, cycloaliphatic and/or arylaliphatic alcohols with from about 2 to about 6, suitably about 2 to about 4 hydroxyl groups bound to nonaromatic carbon atoms. Examples of such polyalcohols are glycols and dialkanols as are used in connection with the OH polyester of the paste forming resin.

Three- or higher valency polyalcohols such as glycerin, trimethylolpropane, di-or tri-methylolpropane ether, trimethylol ethane, pentaerythritol, dipentaerythritol, 1,2,6-hexanetriol, or trishydroxyethyl isocyanurate can be employed to increase functionality and to produce branching. The polyalcohols can be substituted by monovalent alcohols only in small amounts. The choice of the alcohol component depends, among other things, on the desired content of free hydroxyl groups, the amount of monocarboxylic acid used, and the required solubility and dilutability. The polyesters used, if required, can be urethaneized with mono- or diisocyanates.

To achieve the desired water solubility, the process of producing the resins can be broken off once the right degree of condensation has been attained or, more advantageously, a higher molecular weight polyester containing OH groups is reacted with acid anhydrides, suitably cycloaliphatic anhydrides.

A similar effect is achieved by reaction with bisanhydrides, trimellitic anhydride, trimellitic monoalkylester, or maleic anhydride adducts on fatty acid unsaturated in isolated or conjugate manner. Another advantageous process involves reducing the acid number of a highly acid polyester precondensate by at least partial reaction with epoxy containing compounds, Such as the glycidyl ester of versatic acid sold by Royal Dutch Shell under the trademark Cardura E-10, epoxidized linseed oil or soybean oil, or polyglycidyl ethers. Suitably the OH polymer is a reaction product with a mean molecular weight (Mn) of advantageously from about 2000 to about 100,000 as determined by gel chromatography with a polystyrene standard, and a suitable acid number between about 5 and about 150, in relation to solid resin, comprising a) a polyester or a copolymer with a hydroxyl number between about 20 and about 300, suitably over about 40, and less than about 200, and most suitably over about 50, and less than about 130, based on resin solids, b) a mixture of polycarboxilic anhydrides containing trimellitic acid units, with an acid number between about 10 and about 1000, and suitably over about 100, and less than about 800, produced by a reaction of trimellitic anhydride with suitable dihydric alcohols, and c) epoxidized oils having an epoxy number between about 1 and about 50, suitably over about 2, and less than about 25, and most suitably over about 3, and less than about 15, whereby the equivalent ratio between carboxylic groups and epoxy groups is from about 3:1 to about 1:3, suitably from about 1.25:1 to about 1:1.25, and the solids ratio between the bisanhydride (b) and the OH polymer (a) is between about 50:50 and about 10:90, suitably between about 40:60 and about 15:85. Suitably an aqueous dispersion is produced after neutralization from the polyester thus obtained. A mixture of unsaturated monomers is in the aqueous dispersion Further water is added to the existing polymerization mixture to optimize the conditions for emulsion polymerization.

Virtually all free radical polymerizable and copolymerizable monomers can be used as α,β-unsaturated monomers. However, the usual restrictions concerning copolymerization apply, as set out in the Q- and e-scheme according to the textbook of Alfrey and Price, or as determined by the copolymerization parameters. The choice of unsaturated monomers not containing additional reactive groups is based on mechanical and compatibility characteristics.

Polymerization can be carried out with hydrophilic monomers, but this is generally not necessary. Acrylic alkylesters, methyacrylic alkyl esters and/or maleic or fumaric dialkylesters can be used, $C_{1-20}$ alkyl residues arranged in a linear or branched aliphatic chain and/or as cycloaliphatic and/or (alkyl) aromatic residues. "Hard" monomers with a high glazing temperature for use as homopolymers are, for instance, the isomers of vinylaromatic type such as styrene, a-methyl styrene, vinyl toluene, p-tert-butyl styrene, or methacrylic ester with short aliphatic chains such as methyl methacrylate, ethyl methacrylate, but also cyclohexyl methacrylate, iso-bornyl methacrylate, dihydro-dicyclo-pentadienyl methyacrylate, (meth)-acrylamide, and/or (meth)-acryl nitrile. On the other hand, "soft" monomers are acrylic esters with a long alcohol chain such as n-butyl acrylate, isobutyl acrylate, tert-butyl acrylate, 2-ethyl-hexyl acrylate, and/or lauryl acrylate. Unsaturated ethers such as ethoxyethyl methacrylate or tetrahydrofurfuryl acrylate can also be used.

Monomers of the vinyl ester type, suitably vinyl esters of branched $C_{5-13}$ monocarboxylic acids, most suitably vinyl esters of versatic acid, can also be used proportionately, while maintaining appropriate reaction conditions. Suitably polymerizable hydroxyl containing monomers contain, in addition to an ethylenically unsaturated group, at least one OH group on a $C_{2-20}$ linear or branched aliphatic, cycloaliphatic structure. Particularly suitable are hydroxy-alkyl (meth)-acrylates such as hydroxyethyl acrylate, 2-hydroxypropyl methacrylate, butanediol-1,4-monoacrylate, propylene glycol monoacrylate, 2,3-dihydroxypropyl methacrylate, polypropylene glycol monoacrylate, or dihydroxyalkyl fumaric ester. Also N-hydroxyalkyl(meth)-acrylamides, or N-hydroxyalkyl fumaric acid mono- or diamides can be used such as N-hydroxyethyl acrylamide, or N-(2-hydroxypropyl) methacrylamide. Special elastic characteristics can be achieved by using a reaction product of hydroxyalkyl methacrylate with ε-caprolactone.

In addition, small amounts of ethylenically polyunsaturated monomers with at least two free radical polymerizing double-bonds can be used, such as divinylbenzene, 1,6-hexanedioldiacrylate, or the reaction product of diisocyanate and hydroxyalkyl-(meth)acrylates.

By incorporating 0 to about 60 wt. %, suitably from about 0.5 to about 40 wt. %, of thermally reactive vinyl monomer it is possible initially to produce polymers capable of dispersion in water, which after application to a substrate and a corresponding thermal aftertreatment are transformed to the crosslinked state. Unsaturated monomers with groups suitable for crosslinking are such as contain i) epoxy groups with, for instance, glycidyl(meth)acrylate, or alkyl glycidyl(meth)acrylate, glycidyl- or alkyl glycidyl(meth)arylamide, or allyl glycidyl ether;

ii) blocked isocyanate groups such as, for instance, isocyanatoethyl(meth)-acrylate, 1-(4-isopropenyl-phenyl)-1-methylisocyanate, or (1-alkenyl-isocyanate blocked with caprolactam or ketoxime;

iii) N-alkoxyalkylamides, such as in methoxy- or ethoxymethyl-(meth)-acrylamide, or the corresponding compounds of other ethylenically unsaturated acids such a maleic, fumaric, itaconic, or crotonic acid; and/or iv) carboxyl groups Such as (meth)acrylic acid, maleic acid, fumaric acid or their hemiesters or hemiamides.

When using glycidyl methacrylate and methacrylic acid, the corresponding glycidyl dimethacrylate, for instance, is produced automatically during polymerization. Preferred dispersion copolymers, for example, can be made from monomers or comonomers of up to 100 wt. % methyl methacrylate and/or n-butyl-methacrylate, and 0 to about 20 wt. % glycidyl methacrylate, and 0 to about 20 wt. % (meth)acrylic acid, whereby the sum of the monomer units always equals 100. Particularly suitable is a monomer mixture ratio containing from about 15 to about 80 wt. % methyl methacrylate, from about 15 to about 50 wt. % n-butylacrylate, 0 to about 15 wt. % glycidyl methacrylate and 0 to about 5 wt. % methacrylic acid.

The dispersion is, for instance, produced by preparing an initial batch of polyester in the form of a from about 5 to about 65 wt. % aqueous system and then polymerizing the vinyl monomers with to the addition of a polymerization initiator and, if required, other conventional additives such as emulsifiers and/or protective colloids and/or substances to control the molecular weight. Suitably from about 5 to about 95 wt. % based on the total solids in the resin of the carboxyl containing and OH containing polycondensate is copolymerized with from about 95 to about 5 wt. % of α,β-unsaturated monomers.

Suitably over from about 10, particularly over from about 25 wt. % carboxy functional polycondensate, and suitably less than about 90, most suitably less than about 75 wt. % of monomers are used, whereby the sum of the two constituents is 100 wt. %. The carboxy functional polymer with the entire water can be prepared as an aqueous system together with a part of the initiator and slowly heated to the required polymerization temperature, whereupon the monomer mixture is slowly added, within 30 to 180 minutes, together with the remainder of the initiator. It is also possible to prepare, in each case, an initial batch comprising a part of the water with the carboxy functional polymer and to produce the remainder of the carboxyl containing polymers from the remaining water, and the vinyl monomers a prepolymer emulsion, which are then slowly added to the initial bath preheated to polymerization temperature and containing a polymerization initiator. Once the inflow has ended, the entire mixture is still stirred again for from about 1 to about 2 hours from at about 60° C. to about 90° C., suitably at from about 70° C. to about 85° C., adding a further initiator, if required, to achieve complete conversion. The solids content of the polymer dispersions produced is generally between from about 5 to about 75 wt. %, suitably from about 10 to about 65 wt. %. The value of the mean molecular weight of the polymer produced is generally from about 50,000 to about 10 million, suitably from about 75,0000 to about 1 million in relation to standard polystyrene, measured by means of gel permeation chromatography.

The free radical polymerization initiators can be percarbonates, peresters such as tert-butyl perpivalate, tert-butyl peroctoate, tert-butyl perbenzoate, peroxides such as benzoyl peroxide, o-methoxybenzoyl peroxide, dichloriobenzyl peroxide, hydroperoxides such, as tert-butylhydroxy peroxide, or cumenehydroperoxide, or aliphatic azo compounds such as azo-diiso-butyric acid dinitrile. The initiator can be water soluble or monomer soluble. Suitable initiators are e.g. sodium-, potassium-, and ammonium peroxydisulfate, or sodium-, potassium-, ammonium peroxydisulfate redox systems containing sodium-, potassium-, or ammonium sulfides, ammonium sulfites or other reducing agents.

The amount of polymerization initiator is generally from about 0.01 to about 10 wt. %, suitably from about 0.02 to about 5 wt. %, most suitably from about 0.05 to about 3 wt. % based on the total amount of vinyl monomers. It is possible to reduce the molecular weight of the polymers in a manner known per se by using molecular weight regulators such as mercaptan, halogen containing compounds and other radical transmitting substances. Suitably butyl mercaptan, dodecyl mercaptan, tetrakis-nmercapto-acetyl-pentaerythritol, tert-butyl-o-thiocresol, chloroform, bromoform, trichloro-ethenylene, trichloro-bromo-methane, carbon tetrachloride, and toluene, or dimerized α-methylstyrene can be used. Mixtures of from about 95 to about 10 wt. % acrylated polyester with from about 5 to about 90 wt. % urea containing polyurethane dispersion can be used for the production of a good water dilutable metallic base coat.

Another group of water dilutable, high molecular weight emulsion type binders are acrylated polyurethanes, which are used either by themselves or mixed with polyurethane (urea) dispersions.

Acrylated polyurethanes are e.g. reaction products produced by free radical solution-, emulsion- or suspension polymerization of copolymerisable α,β-unsaturated monomers in the presence of polyurethane resins which, if required, can contain urea groups. The production of a stable dispersion depends on the acid number (A) of the polyurethane dispersion ($A_{(PU)}$) and the proportion of monomers in accordance with the formula $$A_{(PU)} = \frac{A_{(end\ product)} \times 100}{100 - \%\ monomer}$$

The acid number of the acrylated polyurethane dispersion ($A_{(end\ product)}$) is between about 12 and about 40. The possibly available hydroxyl number is introduced by unsaturated monomers containing hydroxyl groups. It is suitably between about 5 and about 100. A more suitable lower limit is about 20, and the upper is about 80. From about 95 to about 5 wt. % polyurethane is used to produce the acrylated polyurethanee resin, with from about 5 to about 95 wt. % unsaturated monomers. Suitably less than about 60 wt. %, and particularly less than about 50 wt. % polyurethane resin, and at least about 20 wt. % suitably at least about 30 wt. % polyurethane resin is used based on the total resin solids. Generally no emulsifiers are added.

The polymerization of the monomers occurs in the same manner as the production of acrylated polyesters described above. The essential difference is that a polyurethane dispersion is used instead of the carboxyl containing polyesters for graft polymerization. The dispersion included in the polyurethane resin can contain unsaturated groups to promote grafting. Grafting is promoted due to the incorporation of unsaturated carboxylic acids such as maleic acid, fumaric acid, or unsaturated fatty acids in the polyester, or due to unsaturated monomers, such as hydroxyalkyl methacrylate, which defunctionalize polyisocyanates to diisocyanates. Suitably from about 16 to about 100 wt. %, more suitably from about 20 to about 90 wt. %, most suitably from about 35 to about 85 wt. % of ethylenically unsaturated monomers are used with 0 to about 65 wt. %, advantageously from about 10 to about 60 wt. %, more suitably from about 15 to about 20 wt. %, or polymerizable, hydroxyl containing monomers, and 0 to about 7 wt. %, suitably without poly-unsaturated monomers. The ethylenically unsaturated monomers do not include reactive groups other than the unsaturation. Examples of monomers which can be used have already been given above in connection with the acrylated polyesters.

In the production of the aqueous dispersion the free radical polymerizable, ethylenically unsaturated monomers can be slowly added to the heated aqueous dispersion of the polyurethane resin. During this process it is possible to add the entire monomer at once or one can initially add only a part of the monomer and add the remainder in small doses during the reaction. The monomers can suitably also be made with water into a preemulsion with a part of the polyurethane dispersion. This preemulsion is then slowly added to the initially present remaining polyurethane dispersion. Suitably organic initiators are used that are not soluble in water. These are either added to the initial batch, or are added dropwise together with the monomers. These initiators can also be added at various concentrations in proportion to the initial batch which contains a part of the monomers. The remainder of the initiators is added in small doses, together with the remaining monomers. The free radical initiation of the polymerization is brought about by the thermal decomposition of organic peroxides such as tert-butyl-peroctoate, or with the aid of azo-compounds such as azo-bis-isobutyronitrile. The reaction temperature depends on the rate of decomposition of the initiator and, if required, can be reduced by appropriate redox systems. Polymerization is generally effected at a temperature of from about 30° C. to about 100° C., suitably from about 60° C. to about 95° C. The temperature can be increased to about 130° C. if processing takes place at a pressure of up to about 10 bars.

The binders used for completion can also contain amine formaldehyde condensation resins as hardeners or otherwise to improve application characteristics. These resins can be produced, for instance, by reacting aldehydes with urea, N-alkyl-urea, glycoluril, dicyandiamide, various triazines such as melamine, benzoguanamine, or acetoguanamine, or their mixtures, suitably followed by total etherification with low molecular weight monoalcohols. Depending on the reaction condition such as pH temperature, and on the degree of methylolation, one obtains resins having various molecular weight and having varying reactivities. Suitably formaldehyde is used as the aldehyde, in aqueous and/or alcoholic form as a hemiacetate. Paraformaldehyde is conveniently hydrolyzed in warm water or alcohols or is depolymerized in the presence of diluted acids or bases. Also other aldehydes can be used such as glyoxal, acetaldehyde, isobutyroaldehyde, or furfurol. Generally the methylolation is suitably effected with formaldehyde and the addition of weak bases. It is advantageous to react from about 3 to about 6 methylol groups per melamine molecule.

The methylol groups of the aldehyde condensation products are suitably completely reacted with monoalcohols under acid catalysis. Particularly suitable are methanol, ethanol, propanol, butanol, heptanol, benzylalcohol, cyclic alcohols, ethoxyethanol, or butoxyethanol. If higher than $C_4$ alcohols are to be used, suitably the methylol group is first etherified with a lower alcohol whereupon the higher alcohol is introduced by re-etherification. Suitable alcohols are methanol and butanol and their isomers. Particularly suitable are melamine resins which are reacted with from about 3 to about 6 moles formaldehyde and then completely etherified with methanol, or methanol and n- or i-butanol. The resins are produced in a manner known per se and are available from many commercial sources. Etherification by hydroxycarboxlic acids such as hydroxybenzoic acid, alicyclic acid, or dimethylolpropionic acid, produces melamine resins which contain carboxyl groups and the resins are unsaturated if hydroxyalkyl(meth)acrylates, or allyl alcohol was used. Also carbamyl methylated melamine resins can be used, produced by reacting alkoxy methylated melamine resins with alkylcarbamates under slightly acid conditions.

The coating media produced from the described completion binder and from the pigment pastes according to the present invention can advantageously contain inorganic or organic rheology modifiers. For instance, water soluble cellulose ethers, synthetic polymers with ionic and/or associatively acting groups, such as polyvinyl pyrrolidone, styrene maleic anhydride, or ethylene maleic anhydride copolymers, and their derivatives, as well as hydrophobically modified ethyoxylated polyurethanes, or polyacrylates can be used as thickeners. Particularly suitable thickeners are polyacrylate copolymers containing carboxyl groups, if required, slightly crosslinked with an acid number of from about 60 to about 780, suitably from about 150 to about 300. It is also possible to control the rheological characteristics with microgels.

Dispersal takes place during lacquerification due to the good wetting characteristics. Flocculation or agglomeration of the pigments is thus prevented. The water dilutable coating media produced from the pigment paste can be used as industrial lacquers, such as in the automobile industry. Metallic base coats can he obtained with e.g. added aluminum flakes. These insure good intermediate adhesion, excellent optical appearance, and superb mechanical characteristics,. Therefore, coating media prepared with the use of paste binders of the invention, are also well suited for use as primers on plastic surfaces. They have low swelling characteristics in the presence of water, can be applied without problem by electrostatic high speed rotary devices, and are highly elastic at low temperature. They can be sprayed "wet-in-wet" with a transparent lacquer and then baked together it temperatures such as 140° C. In addition, they are suitable for repair purposes, because they develop excellent characteristics even after curing at as low a temperature such as 80° C.

According to a suitable embodiment the present invention relates to aqueous coating media containing the binder formulation of the present invention for producing pigment pastes. The aqueous coating media of the invention are suitably based on a film forming material of an aqueous dispersion of water dilutable binder, suitably containing (i) a mixture of from about 85 to about 100 parts by weight of high molecular weight and, an optimal acrylated polyurethane (urea) dispersion, and 0 to about 15 parts by weight of a fully etherified amine formaldehyde condensation resin, or (ii) a mixture of from about 20 to about 50 parts by weight of high molecular weight polyurethane (urea) dispersion, from about 5 to about 30 parts by weight of fully etherified amine formaldehyde condensation resin, and from about 40 to about 80 parts by weight of alkyd or polyester resins which can be urethaneized or acrylated, or self crosslinking or externally crosslinking acrylate resins, whereby from about 2 to about 20 parts by weight of the high molecular weight polyurethane (urea) dispersion is substituted by the binder formulation for producing pigment pastes according to the present invention. In this connection the percentages by weight are based, in every case, on the solids content. The aqueous coating media contain, in addition to the above percentually quantified constituents, pigments and, if required, fillers, solvents, auxiliary substances, and other additives.

According to another suitable embodiment of the present invention, from about 99 to about 70 parts by weight, solids basis, of an aqueous mixture is prepared from (i) an emulsion type high molecular weight acrylated polyurethane, or acrylated polyester resin composition, and (ii) a high molecular weight polyurethane (urea) dispersion, at the (i):(ii) weight ratio of from about 1:10 to 10:1, wherein from about 1 to about 30 parts by weight of said dispersion is substituted by the pigment paste forming resin.

The following are illustrative examples of paste forming resins in accordance with the present invention.

EXAMPLES

Paste forming resin 1

1687 g of a linear saturated polyester obtained from adipic acid together with neopentyl glycol and hexaniol-1.6 in a molar ratio of 1:1 having a hydroxyl number of 104 and a viscosity at 25° C. of 2.6 Pa is stirred in a reactor having an internal thermometer and reflux condenser, and cold mixed with 275 g dimethylolpropionic acid, and 796 g dichyclohexylmethane diisocyanate. After a termination of the exothermic reaction the mixture is heated to and kept at 120° C. until its NCO content is under 0.8%. Thereafter, the mixture is diluted with 888 g butoxyethanol.

| | |
|---|---|
| Solids content (30 minutes 150° C.) | 75 wt. % |
| Acid number (referring to solids content) | 38 |
| Viscosity at 25° C. after dilution with butoxyethanol to 40% | 60 Mpa |

A mixture of 88.6 g dimethylisopropanolamine and 88.6 g water is added rapidly to 1920 g of this resin solution. 2350 g water are slowly added after 15 minutes stirring, forming a highly Viscous clear paste having the following parameters:

| | |
|---|---|
| Solids content (30 minutes 150° C.) | 34.1 wt. % |
| Viscosity at 25° C. | 400 mPa |
| MEQ value | 55 |
| pH | 6.8 |

Paste forming resin 2

1395 g of a linear saturated polyester prepared form adipic acid and the neopentylglycol ester of hydroxypivalic acid, and having a OH number of 112 and a viscosity at 25° C. of 8.7 Pa, is stirred in a reaction vessel having an internal thermometer and reflux condenser, and 161 g dimethylol propionic acid and 163 g trimethylolpropane are added and heated to 90° C. until dissolution. Then the mixture is cooled to 50° C. After addition of 165 g tetramethyl cylilene diisocyanate the mixture is slowly heated to 120° C. until its NCO content is below 0.2%. Thereafter, the mixture is diluted with 861 g methoxypropanol.

| | |
|---|---|
| Solids content (30 minutes 150° C.) | 75 wt. % |
| Acid number (referring to solids content) | 27 |
| Viscosity at 25° C. (diluted with methoxypropanol to 40%) | 210 mPa |

A mixture of 58.3 g diethylethoanolamine and 58.3 g water is rapidly added to 1963 g of this resin solution, and the mixture is heated to 80° C. Thereafter, the mixture is diluted with 2585 g water to form a turbid, highly viscous paste which can easily be formed when warm, and having the following parameters:

| | |
|---|---|
| Solids content (30 minutes 150° C.) | 32.3 wt. % |
| Viscosity at 25° C. | 1.3 mPa |
| MEQ-value (per 100 g solids) | 42 |
| pH | 7.6 |

Paste forming resin 3

551 g of a linear saturated polyester prepared from adipic acid and hexandiol-1.6 and having a hydroxyl number of 86, are intensively stirred in a reactor having an internal thermometer and reflux condenser, and 59.7 g cyclohexane dimethanol, and 64 g dimethylol propionic acid in 297 g N-methylpyrrolidone are added, and a solution is formed at 50° C. 216 g hexanediisocyanate are slowly added without exceeding a temperature of 55° C. After termination of the exothermal reaction the mixture is kept at 65° C. until its NCO content is below 0.8%. Thereafter, the mixture is diluted with 26.7 g methanol.

| Solids content (30 minutes at 150° C.) | 73.4 wt. % |
|---|---|
| Acid number (referring to solids content | 31 |
| Viscosity at 25° C. (after dilution with N-methyl pyrrolidone to 40%) | 60 mPa |
| Gel permeation chromatography in tetrahydrofuran | Mn = 2,200, Mw = 10,000 |

564 g of this resin solution are heated to 80° C. and added to a mixture of 24.6 g triethylamine and 64.4 g water. After 5 minutes 103.4 g butoxyethanol and 501.6 g water are added slowly to form a turbid, highly viscous paste which is well formable when warm, and has the following parameters:

| Solids content (30 minutes 150° C.) | 31.6 wt. % |
|---|---|
| MEQ-value | 42 |
| pH | 8.9 |
| Viscosity at 25° C. | 510 mPa |

We claim:

1. A pigment paste forming resin having a viscosity of from about 50 to about 5,000 mPa measured in a coaxial cylindrical viscometer with a shear gradient of 644 sec$^{-1}$ and a solids content of from about 20 to about 40%, comprising
   (i) from about 20 to about 50 parts by weight of a polyester urethane resin having an acid number of from about 10 to about 50, with from about 70 to about 100% of the acid groups being neutralized, the resin being prepared by the reaction of
      (a) one or more polyester polyols that do not contain any carboxyl groups, having an OH number of from about 35 to about 200, and a number average molecular weight of from about 500 to about 5000, mixed with from about 2 to about 30 wt. % based on the polyester polyol of one or more low molecular weight diols having a molecular weight of from about 60 to about 350, whereby a part of the low molecular weight diol contains at least one acid group capable of forming an anion, and with 0 to about 6 wt. % based on the polyester polyol of one or more low molecular weight triols having a molecular weight of from about 60 to about 350, said reaction being with
      (b) one or more diisocyanates in which where the ratio between the OH groups of polyester polyol, diol, and triol to the NCO groups of the diisocyanate is more than from 1.0 to 1.3, whereby the quantity of diisocyanate is selected to insure that the polyester urethane produced has a number average molecular weight of from about 2,000 to about 30,000;
   (ii) from about 0.3 to about 18 parts by weight of ammonia and/or an amine;
   (iii) a sufficient amount of a member of the group consisting of alkyl alcohols, alkoxy ethanols and alkoxypropanols which are at least partly miscible with water and serve as solubilizers and to adjust the viscosity of the paste forming resin so that it remains suitable for pasting; and
   (iv) from about 15 to about 75 parts by weight of water.

2. A process for preparing a pigment dispersion, which comprises mechanically dispersing a pigment into a paste with the pigment paste forming resin of claim 1.

3. The process of claim 2, wherein from about 5 to about 65% wt. based on said paste pigment is dispersed in from about 10 to about 95% wt. of said paste forming resin, in the presence of from 0 to about 40% wt. water, 0 to about 5% wt. of a solvent, 0 to about 5% wt. of ammonia and/or an amine, and 0 to about 5% wt. of pigment paste forming auxiliary substances.

4. An aqueous coating composition comprising from about 99 to about 70 parts by weight of one or more high molecular weight emulsion type binders diluted in water and having an acid number of the solid resin between about 5 and about 50, the acid groups thereof being entirely or partly neutralized, and having a viscosity under 500 mPa, and having a mean particle size of from about 50 to about 500 nm, and from about 1 to about 30 parts by weigh of the pigment paste forming resin of claim 1.

5. The coating composition of claim 4, wherein the composition comprises from about 99 to about 70 parts by weight, solids basis of a mixture of (i) an emulsion type, high molecular weight acrylated polyurethane, or acrylated polyester resin composition diluted in water, and (ii) a high molecular weight polyurethane (urea) dispersion, at the (i):(ii) weight ratio of from about 1:10 to about 10:1, from about 1 to about 30 parts by weight of said dispersion being substituted by the pigment paste forming resin.

6. A pigmented, aqueous coating composition which comprises a mixture of (a) from about 85 to about 100% wt. based on (a) of a high molecular weight polyurethane (urea) dispersion, and 0 to about 15% wt. of a fully etherified amine formaldehyde condensation resin, or (b) from about 20 to about 50% wt. based on (b) of a high molecular weight polyurethane(urea), from about 5 to about 30% wt. of a fully etherified amine formaldehyde condensation resin, and from about 40 to about 80% wt. of an optionally urethanized or acrylated alkyl or polyester resin, or a self crosslinkable or externally crosslinkable acrylate resin, and in said (a) or said (b) from about 1 to about 30% wt. of said dispersion is replaced by the pigment paste forming resin of claim 1.

7. The aqueous coating composition of claim 6, further comprising one or more fillers, solvents, auxiliary pigment substances, and lacquer additives.

8. A pigment paste adapted to be incorporated in an aqueous coating composition, comprising one or more pigments dispersed in a pigment paste forming resin of claim 1.

9. The pigment paste of claim 8, comprising from about 5 to about 65 parts by weight pigment is dispersed in from about 10 to about 95 parts by weight of said paste forming resin, in the presence of from 0 to about 40 parts by weight water, 0 to about 5 parts by weight of a solvent, 0 to about 5 parts by weight of ammonia and/or an amine, and 0 to about 5 parts by weight of pigment paste forming auxiliary substances, said parts by weight totalling 100 parts by weight.

10. A process for coating a substrate which comprises applying to said substrate the pigment paste of claim 8, and curing said coating.

* * * * *